(12) United States Patent
Wang et al.

(10) Patent No.: US 7,379,513 B2
(45) Date of Patent: May 27, 2008

(54) CHANNEL ESTIMATION IN CDMA COMMUNICATIONS SYSTEMS USING BOTH LOWER POWER PILOT CHANNEL AND HIGHER POWER DATE CHANNEL

(76) Inventors: Rui R. Wang, deceased, late of Ottawa (CA); by Chao Wang, legal representative, 1204-900 Dynes Road, Ottawa, Ontario (CA) K2C 3L6; Mohamed El-Tarkhuni, c/o American University of Sharjah, P.O. Box 26666, Sharjah (AE); Zhi Ding, 15 Carlsbad Pl., Iowa City, IA (US) 52246; Yuri S. Shinakov, Vilnusskaja ul. D. 7, Kor. 2, kv 125, Moscow, 117574 (RU); Alexandre M Chloma, g. Zhukovski, ul. Gagarina, dom 63, kv. 27, Moskovskaja Oblast, 140160 (RU); Mikhail G. Bakouline, g. Podolsk, ul. Kirova, d. 35, kv 31, Moskovskaja Oblast, 142110 (RU); Vitali B. Kreindeline, ul. Grajvoronvskaja, d. 8, kor. 1, kv. 87, Moscow, 109518 (RU)

( * ) Notice: Subject to any disclaimer, the term of this patent is extended or adjusted under 35 U.S.C. 154(b) by 743 days.

(21) Appl. No.: 10/478,593

(22) PCT Filed: May 23, 2001
(Under 37 CFR 1.47)

(86) PCT No.: PCT/RU01/00187

§ 371 (c)(1),
(2), (4) Date: Aug. 9, 2004

(87) PCT Pub. No.: WO02/096049

PCT Pub. Date: Nov. 28, 2002

(65) Prior Publication Data

US 2007/0030827 A1   Feb. 8, 2007

(51) Int. Cl.
*H03D 1/00* (2006.01)
*H04L 27/06* (2006.01)
(52) U.S. Cl. ............... 375/340; 375/348; 375/350; 375/232; 375/148
(58) Field of Classification Search ............... 375/335, 375/346, 350, 232, 144, 148, 340; 370/252, 370/335
See application file for complete search history.

(56) References Cited

U.S. PATENT DOCUMENTS 6,614,857 B1 * 9/2003 Buehrer et al. ............. 375/340

(Continued)

OTHER PUBLICATIONS

E.F. Casas and C. Leung, "A Simple Digital Fading Simulator for Mobile Radio", CH2622-9/88/0000-0212 1988 IEEE, pp. 212-217.

*Primary Examiner*—Phuong Phu

(57) ABSTRACT

An iterative arrangement of channel estimator (12), a Kalman filter unit (14), and a soft demodulator (16) is provided for producing an estimate of complex gain of a CDMA communications channel carrying data and pilot channels, and demodulated data of the data channel. An initial channel estimate is produced by the estimator (12) using only the low-power pilot channel. This later is improved by the iterative process using the data channel. The complex gains is represented by a sum of sinusoidal signals with different frequencies and randomly variable amplitude and phase.

14 Claims, 3 Drawing Sheets

U.S. PATENT DOCUMENTS 6,791,960 B1 * 9/2004 Song .......................... 370/335
6,937,642 B2 * 8/2005 Hirata ........................ 375/144

2002/0167913 A1 * 11/2002 Leung ........................ 370/252

* cited by examiner

CHANNEL ESTIMATION IN CDMA COMMUNICATIONS SYSTEMS USING BOTH LOWER POWER PILOT CHANNEL AND HIGHER POWER DATE CHANNEL

This invention relates to channel estimation in CDMA (code division multiple access) communications systems, referred to below as CDMA systems for brevity.

BACKGROUND

It is desirable to provide coherent reception of transmitted signals in a communications system, for which it is necessary to estimate parameters (amplitude, phase, frequency offset, and delay) of the communications channel which affect signal synchronization. A wireless CDMA system typically has multiple paths with multi-path fading, so that such parameters continuously change and must be estimated in an ongoing manner. Accordingly, accurate channel estimation in a CDMA system presents a substantial challenge.

In current CDMA systems, it has been proposed to allocate four channels for each user for synchronization and data communication. These channels are referred to as the pilot channel (P), for synchronization purposes; the fundamental channel (F), for voice signals and low-rate data transmission; the supplemental channel (S), for high-rate data communication, and the control channel (C), for very low-rate data communication for control purposes. One or more of the last three channels, i.e. the data channels, need not be used by a particular user at any time. For simplicity the following description refers primarily to the fundamental channel, but it should be understood that the same comments apply for any one or more of the data channels.

For efficient operation of the CDMA system, it is desirable for the transmit signal power allocated to the pilot channel (i.e. the relative gain of the pilot channel) to be small relative to that of the data channels. The pilot channel can be used for channel estimation, but its relatively low power can result in poor phase accuracy and poor amplitude tracking, so that channel estimation accuracy is not sufficient. For example, the much stronger fundamental channel constitutes interference when estimating the channel parameters from the pilot channel. Increasing the power allocated to the power channel to improve channel estimation is undesirable.

Channel estimation can also conceivably be based on the signals of one or more of the higher-power data channels, for example the fundamental channel. The complexity of such an arrangement has made it undesirable or impractical in a CDMA system, and it may provide slow convergence, or no convergence, due to poor estimates of information symbols.

Accordingly, there is a need to provide improved channel estimation in CDMA systems.

SUMMARY OF THE INVENTION

According to one aspect, this invention provides a method of estimating complex gain of a communications channel in a CDMA system in which a received signal communicated via the communications channel comprises at least one relatively higher power data channel and a relatively lower power pilot channel, comprising the steps of: producing an estimated complex gain of the communications channel initially from only a pilot channel component of the received signal; and, in successive iterations: estimating demodulated data of the data channel from the received signal and the estimated complex gain of the communications channel; and improving the estimated complex gain of the communications channel in dependence upon the received signal and the estimated demodulated data of the data channel; wherein the estimated complex gain of the communications channel is represented by a sum of a plurality of sinusoidal signals with different frequencies and with randomly variable amplitude and phase.

The representation of the complex gain of the communications channel in this manner enables an accurate estimate of the channel to be provided iteratively from the estimated demodulated data due to the higher power of the data channel, despite a relatively poor accuracy of the initial channel estimate using only the pilot channel. However, the initial channel estimate can be determined relatively easily because it is based only on the pilot channel (i.e. it is not dependent the information of the data channel or the accuracy with which such information is estimated), and the convergence problem discussed above is avoided.

The method preferably comprises the step of transforming a vector of complex data samples representing the received signal to scalar complex numeric sequences, the estimated complex gain of the communications channel being produced using said sequences. This input data transformation enables the complexity of an implementation of the method to be considerably reduced.

Preferably, the step of producing and improving the estimated complex gain of the communications channel comprise Kalman filtering estimates of the complex gain of the communications channel. Estimates of the complex gain of the communications channel are preferably over a plurality of PN code chips prior to the Kalman filtering, so that the Kalman filtering can take place at a sampling rate less than a PN code chip rate.

The invention also provides apparatus for carrying out the above method, comprising a data transform unit for producing two scalar complex numeric sequences from a vector of complex data samples representing the received signal, and an iterative arrangement comprising: a demodulator responsive to one of the two scalar complex numeric sequences and to an estimated complex gain of the communications channel to produce an estimated demodulated symbol of the data channel; a complex gain estimator responsive to the two scalar complex numeric sequences and, except in a first iteration, to the estimated demodulated data symbol produced by the demodulator, for producing an estimated complex gain of the communications channel; and a Kalman filter for filtering the estimated complex gain produced by the complex gain estimator to produce the estimated complex gain for the demodulator.

BRIEF DESCRIPTION OF THE DRAWINGS

The invention will be further understood from the following description with reference to the accompanying drawings, in which where appropriate the same references are used in different figures to denote corresponding elements, and in which by way of example.

DETAILED DESCRIPTION

Figure 1:
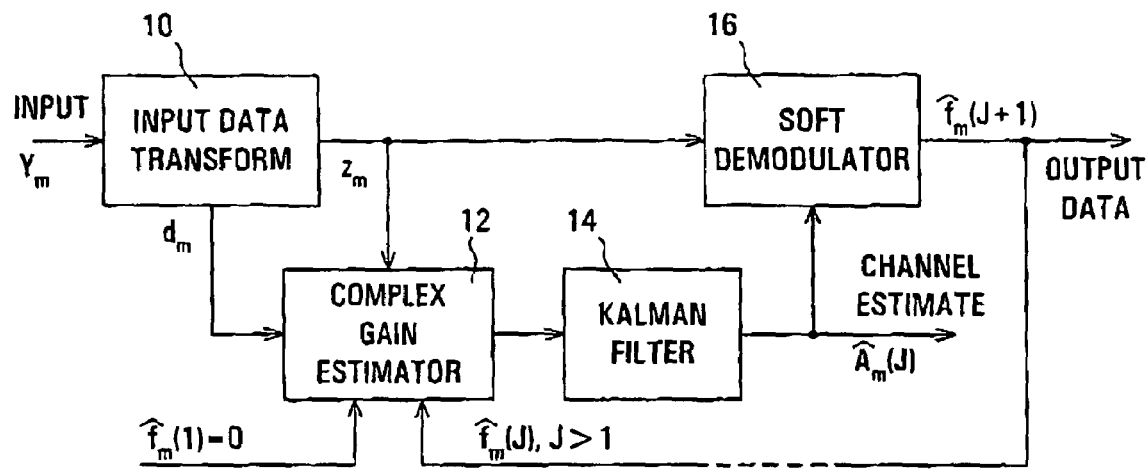
FIG. 1 is a block diagram illustrating a channel estimation and data demodulation arrangement for a CDMA system in accordance with an embodiment of this invention.

Referring to the drawings, an embodiment of the invention is initially described with reference to FIG. 1, which is a block diagram illustrating a channel estimation and data demodulation arrangement for use in a base station of a CDMA system. The arrangement comprises an input data transform unit 10, a complex channel gain estimator 12, a Kalman filter unit 14, and a soft demodulator 16, and operates iteratively as described below.

The unit 10 provides a transformation of a vector $Y_m$ of complex input data samples to scalar complex numeric sequences $z_m$ and $d_m$ which are supplied to the estimator 12. The estimator 12 produces a complex gain estimate which is filtered by the Kalman filter unit 14 to produce a channel estimate $\hat{A}_m(J)$ where J=1, 2, ... is an iteration number. The transformation of the input data by the unit 10 enables the estimator 12 to produce the complex gain estimate without any vector-matrix operations.

The soft demodulator 16 demodulates the sequence $z_m$ in accordance with the channel estimate to produce estimated demodulated data $\hat{f}_m(J+1)$. This estimated data is fed back to the estimator 12 for use in the next iteration J+1 (the feedback path includes a dashed-line segment to indicate the next iteration) and, in a final iteration, constitutes demodulated output data.

The symbol $f_m$ represents data of the fundamental channel F for an observation window m, and the symbol ^ indicates an estimate. For simplicity in this description it is assumed that only the pilot and fundamental channels are present in the input data, but it can be appreciated that the same principles are applicable to the other data channels in a similar manner to the fundamental channel, and the arrangement can be expanded accordingly.

As illustrated in FIG. 1, in a first iteration for which J=1 the estimator 12 is supplied with fundamental channel data $\hat{f}_m(1)$, instead of the previously estimated and fed back data $\hat{f}_m(J)$, J>1 for second and subsequent iterations. Further, as also represented in FIG. 1, in this first iteration this fundamental channel data $\hat{f}_m(1)$ supplied to the estimator 12 is assumed to be zero.

Consequently, in the first iteration the arrangement produces the channel estimate $\hat{A}_m(1)$ from only the pilot channel component of the input data, treating the fundamental channel component as interference for this initial channel estimate. The demodulator 16 is responsive to this initial channel estimate to produce the estimated data $\hat{f}_m(2)$ from the fundamental channel component of the sequence $z_m$.

Although this first channel estimate $\hat{A}_m(1)$ and the estimated data $\hat{f}_m(2)$ produced using it may have relatively poor accuracy due to the low relative power of the pilot channel component and the treatment of the fundamental channel as interference for the first channel estimate, the accuracy of these estimates is progressively improved with one or more subsequent iterations, making use of the information in the more powerful fundamental channel.

This improvement arises in particular from the Kalman filtering of the estimated complex gain in accordance with a particular channel estimation model, which allows for Doppler frequency spreading of the received signal. In this model, the channel is represented by a sum of a plurality of sinusoidal signals with different frequencies, referred to as quasi-harmonics, and with randomly variable amplitude and phase, as described later below. This channel estimation model enables the Kalman filtering to provide accurate tracking of the channel, even though the initial channel estimate based only on the low power pilot channel may be poor.

To facilitate implementation, it is desirable for the Kalman filter unit 14 to operate at a reduced rate, and this can be done by an averager or decimator at the output of the estimator 12. This is not shown in FIG. 1, but is illustrated in FIG. 2, which is a block diagram of an arrangement similar to that of FIG. 1, but in more detail with corresponding equations, as described below, identified for the operations represented by the respective blocks.

Figure 2:
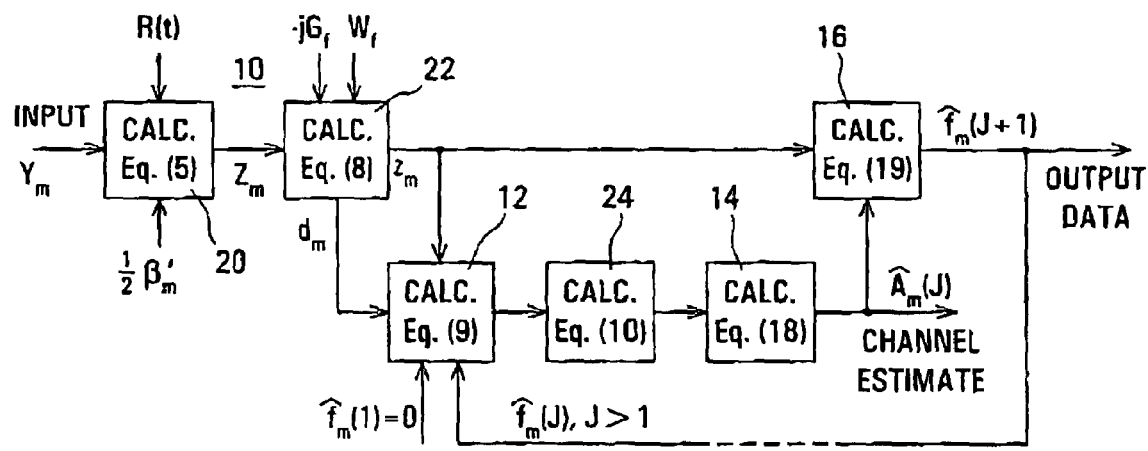
FIG. 2 is a block diagram illustrating a slightly modified form of the arrangement of FIG. 1, indicating the correspondence of blocks to equations in the description.

Referring to FIG. 2, the input data transform unit 10 of FIG. 1 is constituted by a first calculation unit 20, which implements Equation (5) below to produce a vector $Z_m$, and a second calculation unit 22 which implements Equation (8) below to produce the scalar complex numeric sequences $z_m$ and $d_m$ referred to above. The units 20 and 22 are supplied with other parameters in accordance with these equations as described below.

The complex gain estimator 12, Kalman filter unit 14, and soft demodulator 16 of FIG. 1 are constituted in FIG. 2 by calculation units having these same references and which respectively implement Equations (9), (18), and (19) below. The arrangement of FIG. 2 also includes a decimator 24, which implements Equation (10) below, via which the complex gain estimate produced by the unit 12 is supplied to the Kalman filter unit 14.

Implementations of units of the arrangements of FIGS. 1 and 2 are described in detail below with reference to FIGS. 3 to 6. Corresponding equations are described only to the extent necessary to provide a full understanding of this embodiment of the invention.

These equations are based on a mathematical model of the reverse channel from a mobile terminal to the base station in which it is assumed that channel noise is AWGN (Additive White Gaussian Noise) and includes interference from other mobile terminals, that the channel has multiple paths each with unknown independent Rayleigh amplitude, fading, unknown phase, and known delay which is constant during an observation window, that there is a single base station antenna, and that the sampling rate is one sample per PN-chip.

Each path, considered separately for channel estimation, has a delay t given by:

$$t = lT_0 + \tau, -T_0/2 \leq \tau \leq T_0/2 \quad (1)$$

where $T_0$ is the PN chip duration and l is an integer.

A vector-matrix model for received signal samples at the base station (at the PN code rate) in an observation window m for an information symbol is:

$$Y_m = A_m \cdot R(t) \cdot (\beta_m x_m) + \eta_m, m=1, 2, 3 \quad (2)$$

where $Y_m$ is an M-dimensioned column vector of complex input data (i.e. an observation vector), M is a number of information symbols in a single observation window, $\eta_m$ is an M-dimensioned column vector of complex observation noise with zero mean and covariance matrix $2\sigma_\eta^2 1$, $x_m$ and $\beta_m$ are M-dimensioned column vectors of complex information symbols and complex PN code respectively, R(t) is an M by M-dimensioned impulse response matrix which is considered to be accurately known, and $A_m$ is a complex path gain of amplitude A and phase $\phi_m$ which are considered to be constant over the observation window.

Thus:

$$Y_m = \begin{bmatrix} y_{mM+1} \\ \ldots \\ y_{mM+M} \end{bmatrix}, \eta_m = \begin{bmatrix} \eta_{mM+1} \\ \ldots \\ \eta_{mM+M} \end{bmatrix}, x_m = \begin{bmatrix} x_{mM+1} \\ \ldots \\ x_{mM+M} \end{bmatrix}, \quad (3)$$

$$\beta_m = \begin{bmatrix} \beta_{mM+1} \\ \ldots \\ \beta_{mM+M} \end{bmatrix}, A_m = Ae^{-j\varphi_m}, m = 1,2,3\ldots$$

The generation of a complex information signal $x_n$ in the CDMA system is given by:

$$x_n = (1+G_f W_{f,n} f_n) + j(G_s W_{s,n} s_n + G_c W_{c,n} c_n), \beta_n = \alpha_n(\alpha_n^I + j\alpha_n^Q) \quad (4)$$

where the subscripts f, s, and c denote the fundamental, supplementary, and control channels respectively with binary information $f_n$, $s_n$, and $c_n$ respectively at instant n, G is a channel gain, W is a Walsh function, $\alpha_n$ is a long PN code, and $\alpha_n^I$ and $\alpha_n^Q$ are short PN codes. With only the pilot and fundamental channels present as described here, Equation (4) can be simplified accordingly.

Multiplying both sides of Equation (2) by the transposed impulse response matrix R'(t), and then by a vector $\frac{1}{2}\alpha'_m$ that is conjugate to the complex PN code vector, gives an approximation:

$$Z_m = \frac{1}{2}\beta'_m(R'(t).Y_m) = A_m.x_m + \frac{1}{2}\beta'_m R'(t).\eta_m \quad (5)$$

which can be solved as:

$$\hat{A}_m = \hat{B}_m.Z_m \quad (6)$$

where $\hat{B}_m$ is a row matrix calculated as:

$$\hat{B}_m = \frac{(1 - j\hat{f}_m G_f W_f)}{N(1 + G_f^2 \hat{f}_m^2)} \quad (7)$$

and N is a positive integer.

Equations (6) and (7) lead to the following input data transformation:

$$z_m = -jG_f W_f Z_m, d_m = 1.Z_m \quad (8)$$

where $1.Z_m$ means an addition of the elements of the vector $Z_m$, and $z_m$ and $d_m$ are scalar complex numeric sequences with a sampling frequency of $1/NT_0$.

The input data transform unit 10 in FIG. 1 implements this data transformation to produce the sequences $z_m$ and $d_m$ as described above. More particularly, the unit 20 of FIG. 2 implements Equation (5) above to produce the vector matrix $Z_m$, and the unit 22 of FIG. 2 implements Equation (8) above to produce the sequences $z_m$ and $d_m$. In each case this is done for in-phase and quadrature phase components of the received signal samples, represented by (I) and (Q) respectively.

For simplicity, the following description is common to the I and Q components and the signal qualifiers (I) and (Q) are dropped accordingly, although these are shown in the drawings. For example, in FIG. 3 sequences $z_m(I)$ and $z_m(Q)$ are illustrated, and these are referred to either individually or together as the sequence $z_m$ in this description. Likewise, for simplicity respective multipliers shown in FIG. 3 for producing these sequences are denoted by the same reference in the drawings and in the following description.

Figure 3:
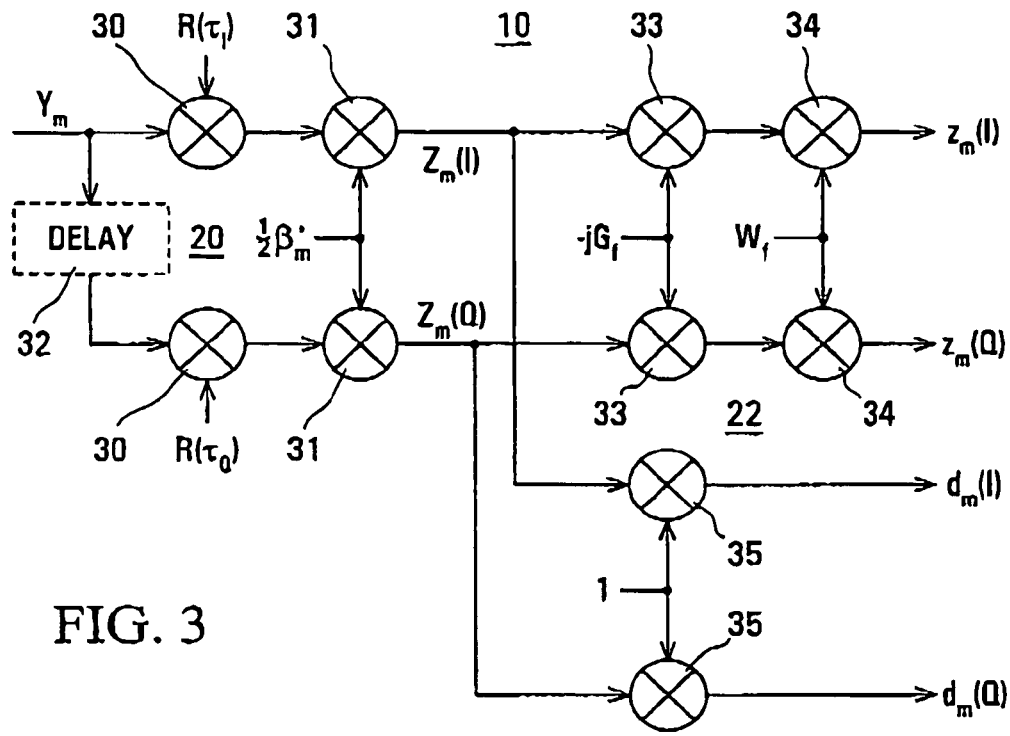
FIG. 3 illustrates one form of an input data transform unit of the arrangement of FIGS. 1 and 2.

Referring to FIG. 3, the calculation unit 20 comprises a multiplier 30 responsive to the input data and the impulse response matrix, and a multiplier 31 responsive to the output of the multiplier 30 and the vector $\frac{1}{2}\beta'_m$ to produce the vector $Z_m$ for each of the I and Q paths. As shown by dashed lines, an input delay 32 may be provided, depending upon the implementation of the CDMA system, to accommodate a possible half-PN-chip delay between the I and Q components. It can be seen that the arrangement of the multipliers 30 and 31 in FIG. 3 corresponds to Equation (5) above.

FIG. 3 also illustrates multipliers 33 to 35 which constitute the calculation unit 22 and are arranged to correspond to Equation (8). Thus for each of the I and Q paths the multiplier 33 is arranged to multiply the vector $Z_m$ by $-jG_f$, the multiplier 34 is arranged to multiply the output of the multiplier 33 by the fundamental channel Walsh function $W_f$, to produce the sequence $z_m$, and the multiplier 35 is arranged to multiply the vector $Z_m$ by 1 to produce the sequence $d_m$.

The input data transformation avoids repeated calculations and thereby simplifies the implementation of the arrangement, in addition to providing $z_m$ and $d_m$ as scalar sequences so that subsequent calculations are simplified. In the latter respect, from Equations (7) and (8) the following Equation (9), which does not involve any vector-matrix operations, can be derived to produce an estimate $\hat{A}_m$ of the unknown complex gain:

$$\hat{A}_m = (d_m - z_m) \cdot \frac{1}{N(1 + G_f^2 \hat{f}_m^2)} \quad (9)$$

Figure 4:
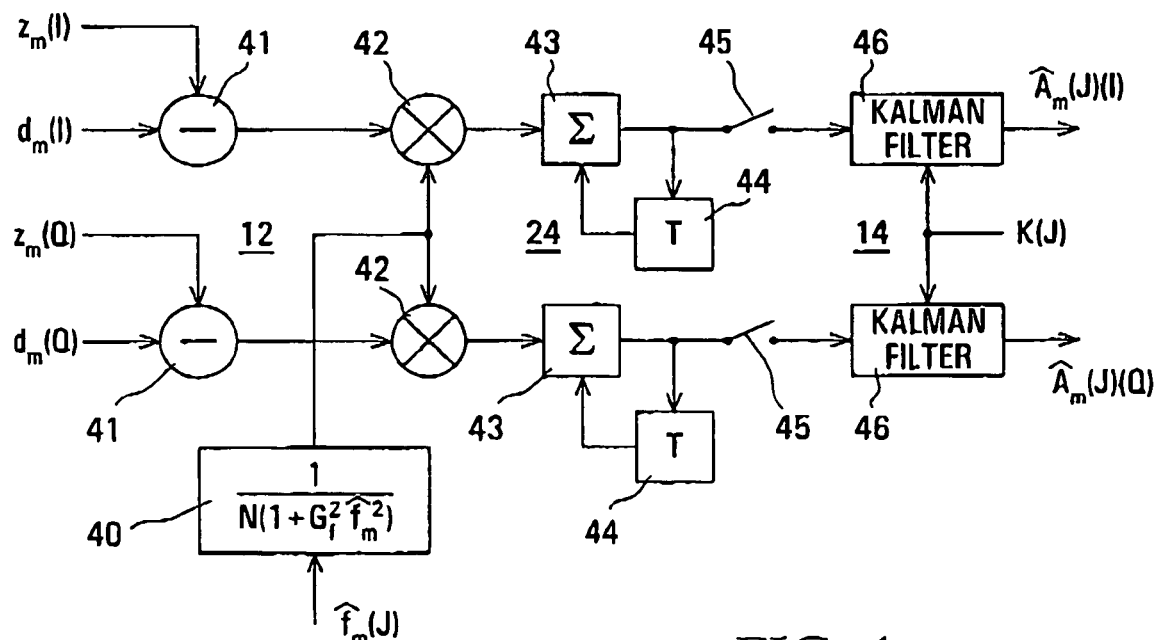
FIG. 4 illustrates one form of a complex gain estimator and a Kalman filter unit of the arrangement of FIGS. 1 and 2, and a decimator of the arrangement of FIG. 2.

FIG. 4 illustrates details of the complex gain estimator 12, decimator 24 which performs an averaging function, and Kalman filter unit 14.

As shown in FIG. 4, the complex gain estimator 12 comprises a coefficient calculation unit 40 and, for each of the I and Q paths, a subtraction unit 41 and a multiplier 42 which are arranged to implement Equation (9) above. Thus the subtraction unit 41 determines the difference $(d_m - z_m)$ on the right-hand side of Equation (9), the unit 40 determines from the parameter $\hat{f}_m(J)$ supplied to it the coefficient constituted by the remainder of the right-hand side of Equation (9), and the multiplier 42 multiplies the difference by the coefficient to produce an estimated complex gain.

As outlined above, the Kalman filtering of the complex gain estimate uses a representation of the complex gain of the channel by a sum of a plurality of sinusoidal signals with different frequencies, referred to as quasi-harmonics, with randomly variable amplitude and phase. Mathematically, this is represented as:

$$A_m = \sum_{k=-K}^{K} \rho_m(k), \rho_m(k) = \rho_{m-1}(k)e^{j\omega(k)} + \xi_m(k), \quad (10)$$

$$k = -K \ldots K, m = 1, 2, \ldots$$

where $\rho_m(k)$ are 2K+1 quasi-harmonics with center frequency $\omega(k)$ within a range of maximum Doppler shift $\pm 2\pi F_D$ where $F_D$ is the maximum Doppler frequency, K is an integer, and $\xi_m(k)$ are 2K+1 uncorrelated sequences of complex Gaussian random values with zero means and variances $2\sigma_\xi^2(k)$.

Equation (2) can be rewritten in the form:

$$Y_m = A_m.T_m + \eta_m, T_m = R(t).(\beta_m x_m) \quad (11)$$

where $T_m$ is a complex column vector depending on signal delay, current PN code segment and transmitted information sequence.

Applying a maximum likelihood function to Equation (11) gives the following estimated complex channel gain:

$$\hat{A}_m = B_m \cdot Y_m, \quad B_m = \frac{T'_m}{\text{real}(T'_m \cdot T_m)} \quad (12)$$

This leads to the simple observation model:

$$\hat{A}_m = A_m + \Gamma_m \quad (13)$$

where $\Gamma_m$ is the sequence of complex Gaussian uncorrelated random values with zero mean and variance $$2\sigma_{\Gamma,m}^2 = \frac{2\sigma_\eta^2}{\text{real}(T'_m \cdot T_m)}.$$

The Kalman filtering process can be simplified by reducing the sampling rate, which can be done by averaging in accordance with an integer parameter L, giving:

$$\tilde{A}_p = \frac{1}{L} \sum_{m=(p-1)L}^{pL} \hat{A}_m = A_p + \gamma_p, \quad p = 1, 2, \ldots \quad (14)$$

where $\gamma_p$ is the sequence of complex Gaussian uncorrelated random values with zero mean and variance $$2\sigma_{\gamma,p}^2 = \frac{1}{L} \sum_{m=(p-1)L}^{pL} 2\sigma_{\Gamma,p}^2.$$

With increasing values of L, dynamic error is increased and fluctuation error is reduced.

Equations (10) and (13) above constitute a model of a filtering process and observations in scalar form. To obtain a filtering algorithm this model is transformed into vector-matrix form using the following notations;
H=[1 1 . . . 1 1] is a 2K+1-dimensioned row vector;
C=diag($e^{jL\omega(-K)}$; $e^{jL\omega(-K+1)}$; . . . $e^{jL\omega(-1)}$; $e^{jL\omega(0)}$; $e^{jL\omega(1)}$; . . .
is a 2K+1 by 2K+1-dimensioned complex matrix;

$$\Phi_p = \begin{bmatrix} \rho_p(-K) \\ \ldots \\ \rho_p(0) \\ \ldots \\ \rho_p(K) \end{bmatrix}$$

is a 2K+1-dimensioned column vector; and $$\xi_p = \begin{bmatrix} \xi_p(-K) \\ \ldots \\ \xi_p(0) \\ \ldots \\ \xi_p(K) \end{bmatrix}$$

is a 2K+1-dimensioned column vector of exciting noises with zero mean and covariance matrix $$D_\xi = \text{diag}\{2\sigma_\xi^2(-K); \ldots 2\sigma_\xi^2(0); \ldots 2\sigma_\xi^2(K)\}.$$

Thus Equations (10) and (13) can be written in the following simple form:

$$\Phi_p = C \cdot \Phi_{p-1} + \xi_p, \quad A_p = H \cdot \Phi_p + \Gamma_p, \quad p=1,2, \quad (15)$$

The model of Equation (15) is strongly linear. Applying known Kalman filter theory, it can be determined that vectors $K_p$ can be calculated in advance and stored if the variable $2\sigma_{\gamma,p}^2$ is changed to a constant, $2\sigma_\Gamma^2$, thus:

$$2\sigma_{\gamma,p}^2 \approx 2\sigma_\Gamma^2 = \frac{2\sigma_\eta^2}{NL(1+\lambda G_f^2)} \quad (16)$$

where the parameter $\lambda$, $0 \leq \lambda \leq 1$, is determined by the accuracy of the estimated data symbol $\hat{f}_m^z$.

This gives the following recursive formulas for Kalman gain calculation:

$$U_p = CV_{p-1}C' + D_\xi$$

$$K_p = U_p H'(HU_p H' + 2\sigma_\gamma^2)^{-1}, \quad V_1 = \frac{1}{2K+1} \cdot 1, \quad p \geq 2 \quad (17)$$

$$U_p = CV_{p-1}C' + D_\xi$$

A recursive algorithm for the Kalman filter is then given by:

$$\hat{\Phi}_{p,pred} = C\hat{\Phi}_p$$

$$\hat{\Phi}_p = \hat{\Phi}_{p,pred} + K_p(\tilde{A}_p - H\hat{\Phi}_{p,pred}), p \leq 2 \quad (18)$$

$$\hat{A}_p = H\hat{\Phi}_p$$

with initial conditions $\hat{\Phi}_i = 0$.

Equation (18) relates to a non-stationary Kalman filter, for which although the sequence of complex vectors $K_p$ can be calculated in advance and stored, a large memory is required for this storage. Instead, a fixed $K_p$ can be chosen by simulation and used to reduce memory requirements.

For implementing the averaging function described above with reference to Equation (14), as shown in FIG. 4 the decimator 24 comprises, for each of the I and Q paths, a summing unit 43, a delay element 44, and a sampling switch 45. The summing unit 43 is arranged to sum over L samples the input complex gain estimate $\hat{A}_m$ with the previous sum in each case fed back via the delay element 44. The result is sampled every L samples by the switch 45 and is supplied to the respective one of two Kalman filters 46, one for each of the I and Q paths, also shown in FIG. 4. The two Kalman filters 46 constitute the Kalman filter unit 14 of FIGS. 1 and 2 and implement Equation (18) as described above with a Kalman gain K(J).

Figure 5:
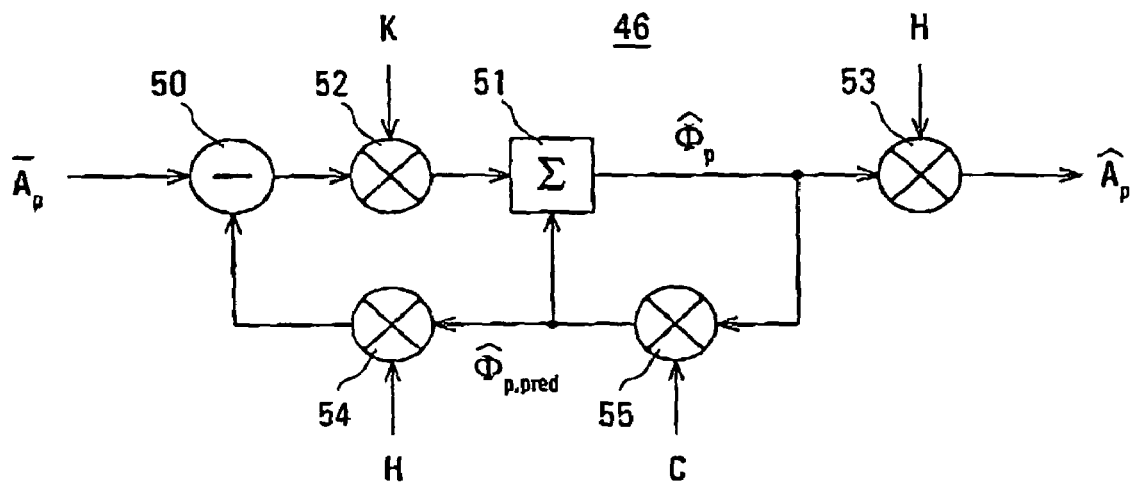
FIG. 5 illustrates one form of a Kalman filter.

FIG. 5 illustrates a Kalman filter 46 in greater detail, the Kalman filter comprising a subtraction unit 50, a summing unit 51, and multipliers 52 to 55, all arranged to implement Equation (18). The summing unit 51 sums the output of the multiplier 52 with $\hat{\Phi}_{p,pred}$, produced at the output of the multiplier 55 by multiplication of its inputs $\hat{\Phi}_p$ and C, to produce $\hat{\Phi}_p$, which is multiplied by H in the multiplier 53 to produce the output $\hat{A}_p$. $\hat{\Phi}_{p,pred}$ is multiplied by H in the multiplier 54, and the product is subtracted from the input $\tilde{A}_p$ in the subtraction unit 50, the output of which is multiplied by the Kalman filter gain K in the multiplier 52. The gain K in FIG. 5 corresponds to the gain K(J) in FIG. 4 and to the gain $K_p$ in Equation (18), and as described above can be calculated in advance and stored or, more conveniently, can be a constant Kalman filter gain. The output $\hat{A}_p$ of the Kalman filter of FIG. 5 corresponds to the channel estimate $\hat{A}_m(J)$ in FIGS. 1 and 2.

The soft demodulator 16 of FIGS. 1 and 2 uses a maximum likelihood method for providing the estimated binary symbol $\hat{f}_m$ of the fundamental channel. The demodulator is simplified by the input data transformation which is provided by the transform unit 10 as described above, and by the orthogonality of Walsh functions to avoid unnecessary operations. A resulting soft demodulator equation is:

$$\hat{f}_m = \tanh(\gamma Q_m), \quad Q_m = \text{real}(\hat{A}'_m \cdot z_m), \quad \gamma = \frac{1}{2\sigma_\eta^2} \quad (19)$$

Figure 6:
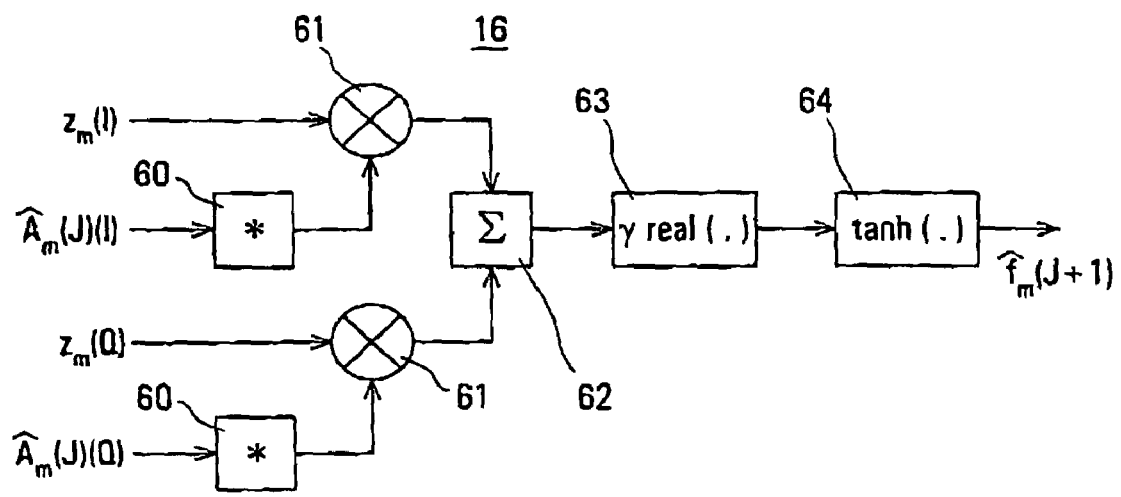
FIG. 6 illustrates one form of a soft demodulator of the arrangement of FIGS. 1 and 2.

FIG. 6 illustrates a corresponding form of the soft demodulator 16, comprising a conjugate function 60 and a multiplier 61 for each of the I and Q paths, a summing unit 62, a function 63, and a tanh function 64.

Referring to FIG. 6, for each of the I and Q paths the function 60 produces the conjugate of the channel estimate $\hat{A}_m(J)$, and the multiplier 61 multiplies this by the transformed input data sequence $z_m$, the outputs of the multipliers 61 being summed by the summing unit 62. The function 63 multiplies the real part of the output of the summing unit 62 by $\gamma$ to produce the product $\gamma Q_m$, and the function 64 produces the hyperbolic tangent of this to constitute the estimated binary data symbol $\hat{f}_m$ of the fundamental channel. Thus the units of FIG. 6 implement the soft demodulator function of Equation (19).

By way of example, it is observed that the various functions of the arrangement described above can be implemented using digital signal processor (DSP) and/or application-specific integrated circuit (ASIC) devices.

Although the above description relates primarily to the fundamental channel in addition to the pilot channel, it will be appreciated by those of ordinary skill in the art how this may be expanded to include the other data channels. It will also be appreciated that the method of the invention can be implemented in ways other than the particular implementation described above.

Thus although a particular embodiment of the invention is described in detail above, it can be appreciated that numerous modifications, variations, and adaptations may be made within the scope of the invention as defined in the claims.

What is claimed is:

1. A method of estimating complex gain of a communications channel in a CDMA system in which a received signal communicated via the communications channel comprises at least one relatively higher power data channel and a relatively lower power pilot channel, comprising the steps of:
   producing an estimated complex gain of the communications channel initially from only a pilot channel component of the received signal; and, in successive iterations:
   estimating demodulated data of the data channel from the received signal and the estimated complex gain of the communications channel; and
   improving the estimated complex gain of the communications channel in dependence upon the received signal and the estimated demodulated data of the data channel;
   wherein the estimated complex gain of the communications channel is represented by a sum of a plurality of sinusoidal signals with different frequencies and with randomly variable amplitude and phase.

2. A method as claimed in claim 1 and comprising the step of transforming a vector of complex data samples representing the received signal to scalar complex numeric sequences, wherein the estimated complex gain of the communications channel is produced using said sequences.

3. A method as claimed in claim 2 wherein the step of transforming comprises multiplying the vector of complex data samples representing the received signal by a transposed impulse response matrix and by a vector that is conjugate to a complex PN code vector to produce a resulting vector, multiplying the resulting vector by a Walsh function of the data channel to produce a first scalar complex numeric sequence, and adding components of said resulting vector to produce a second scalar complex numeric sequence.

4. A method as claimed in claim 3 wherein the demodulated data of the data channel is estimated using the estimated complex gain of the communications channel and said first sequence.

5. A method as claimed in claim 1 wherein the step of producing and improving the estimated complex gain of the communications channel comprise Kalman filtering estimates of the complex gain of the communications channel.

6. A method as claimed in claim 2 wherein the step of producing and improving the estimated complex gain of the communications channel comprise Kalman filtering estimates of the complex gain of the communications channel.

7. A method as claimed in claim 3 wherein the step of producing and improving the estimated complex gain of the communications channel comprise Kalman filtering estimates of the complex gain of the communications channel.

8. A method as claimed in claim 4 wherein the step of producing and improving the estimated complex gain of the communications channel comprise Kalman filtering estimates of the complex gain of the communications channel.

9. A method as claimed in claim 5 and comprising the step of averaging estimates of the complex gain of the communications channel over a plurality of PN code chips prior to said Kalman filtering.

10. A method as claimed in claim 6 and comprising the step of averaging estimates of the complex gain of the communications channel over a plurality of PN code chips prior to said Kalman filtering.

11. A method as claimed in claim 7 and comprising the step of averaging estimates of the complex gain of the communications channel over a plurality of PN code chips prior to said Kalman filtering.

12. A method as claimed in claim 8 and comprising the step of averaging estimates of the complex gain of the communications channel over a plurality of PN code chips prior to said Kalman filtering.

13. Apparatus for carrying out the method of claim 1, comprising a data transform unit for producing two scalar complex numeric sequences from a vector of complex data samples representing the received signal, and an iterative arrangement comprising:
   a demodulator responsive to one of the two scalar complex numeric sequences and to an estimated complex gain of the communications channel to produce an estimated demodulated symbol of the data channel;

a complex gain estimator responsive to the two scalar complex numeric sequences and, except in a first iteration, to the estimated demodulated data symbol produced by the demodulator, for producing an estimated complex gain of the communications channel; and a Kalman filter for filtering the estimated complex gain produced by the complex gain estimator to produce the estimated complex gain for the demodulator.

14. Apparatus as claimed in claim 13 and including an averaging unit for averaging complex gain estimates produced by the complex gain estimator over a plurality of PN code chips and for supplying an averaged complex gain estimate to the Kalman filter at a sampling rate less than a PM code chip rate.

* * * * *

UNITED STATES PATENT AND TRADEMARK OFFICE
CERTIFICATE OF CORRECTION

PATENT NO. : 7,379,513 B2
APPLICATION NO. : 10/478593
DATED : May 27, 2008
INVENTOR(S) : Rui Wang et al.

Page 1 of 1

It is certified that error appears in the above-identified patent and that said Letters Patent is hereby corrected as shown below:

Column 5, line 27 – " $1/2\alpha'_m$ " should read -- $1/2\beta'_m$ --

Column 5, line 30, (EQ 5) – " $Z_m = 1/2\beta'_m (R'(t).Y_m) = A_m.x_m + 1/2\beta'_m R'(t).\eta_m)$ " should read -- $Z_m = 1/2\beta'_m \otimes (R'(t).Y_m) = A_m.x_m + 1/2\beta'_m \otimes (R'(t).\eta_m)$ --

Column 6, line 55, (EQ 10) – " $A_m = \sum_{k=-K}^{K} \rho_m(k).\rho_m(k) - \rho_{m-1}(k)e^{j\omega(k)} + \xi_m(k),$ "

should read -- $A_m = \sum_{k=-K}^{K} \rho_m(k).\rho_m(k) - \rho_{m-1}(k)e^{j\omega(k)} + \xi_m(k),$ --

Column 6, line 65, (EQ 11) – " $Y_m = A_m.T_m + \eta_m, T_m = R(t).(\beta_m.x_m)$ " should read -- $Y_m = A_m.T_m + \eta_m, T_m = R(t).(\beta_m \otimes x_m)$ --

Column 7, line 42 – missing the following after ... -- $e^{j\omega(K-1)}, e^{j\omega(K)}$ --

Column 8, line 30, (EQ 18 – middle line):

" $\hat{\Phi}_p = \hat{\Phi}_{p,pred} + K_p (\tilde{A}_p - H\hat{\Phi}_{p,pred}), p < 2$ " should read -- $\hat{\Phi}_p = \hat{\Phi}_{p,pred} + K_p (\tilde{A}_p - H\hat{\Phi}_{p,pred}), p \geq 2$ --

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,379,513 B2 | |
| APPLICATION NO. | : 10/478593 | |
| DATED | : May 27, 2008 | |
| INVENTOR(S) | : Rui R. Wang et al. | |

It is certified that error appears in the above-identified patent and that said Letters Patent is hereby corrected as shown below:

On the cover page of the Letters Patent, at section (76) under the listing of Inventors, the second inventor "...Mohamed El-Tarkhuni..." should read -- Mohamed El-Tarhuni --

Signed and Sealed this
Twelfth Day of July, 2011

David J. Kappos
*Director of the United States Patent and Trademark Office*